(12) United States Patent
Balastik

(10) Patent No.: US 9,279,463 B2
(45) Date of Patent: Mar. 8, 2016

(54) PIVOT CONTROL MECHANISM

(76) Inventor: George Jiri Balastik, Fuquay Varina, NC (US)

( * ) Notice: Subject to any disclaimer, the term of this patent is extended or adjusted under 35 U.S.C. 154(b) by 818 days.

(21) Appl. No.: 13/572,998

(22) Filed: Aug. 13, 2012

(65) Prior Publication Data

US 2014/0041984 A1 Feb. 13, 2014

(51) Int. Cl.
*F16D 41/12* (2006.01)

(52) U.S. Cl.
CPC .............. *F16D 41/12* (2013.01); *Y10T 74/2101* (2015.01); *Y10T 74/2136* (2015.01)

(58) Field of Classification Search
CPC ......... E06B 11/08; G07F 17/145; G07C 9/02; Y10S 194/903; Y10T 74/2133; Y10T 74/2101; Y10T 74/2107
USPC ....................................................... 49/42–47
See application file for complete search history.

(56) References Cited

U.S. PATENT DOCUMENTS

| | | | | |
|---|---|---|---|---|
| 1,602,486 A | * | 10/1926 | Hedley et al. | 49/35 |
| 1,791,922 A | * | 2/1931 | Distler et al. | 49/46 |
| 3,602,350 A | * | 8/1971 | Collins | 194/239 |
| 6,065,246 A | * | 5/2000 | Detassis | E06B 11/08 49/47 |

FOREIGN PATENT DOCUMENTS

FR    EP 0640741 A1 *  3/1995  .............. E06B 11/08

* cited by examiner

*Primary Examiner* — Thomas Diaz
(74) *Attorney, Agent, or Firm* — Robert Platt Bell

(57) ABSTRACT

A pivot control mechanism selectively controls rotation of a pivot control shaft by an electric impulse from a solenoid, which locks the pawl into the ratchet, thereby permitting the shaft to rotate in a selected direction. When a passage direction is chosen, the cam followers move out of the home position of a lofted ratchet over the peak position to the next home position. Guiding pins controlling the axial motion of the lofted ratchet in conjunction with the compression springs secure the cam followers in the home position. A shock absorber acting on the cam is used to prevent the turnstile from over rotating with any great amount of force, softening the return of the cam followers to the home position. A micro switch, when activated, sends a signal to the control board, which through the action of the solenoid, locks the pawls into the ratchet.

14 Claims, 6 Drawing Sheets

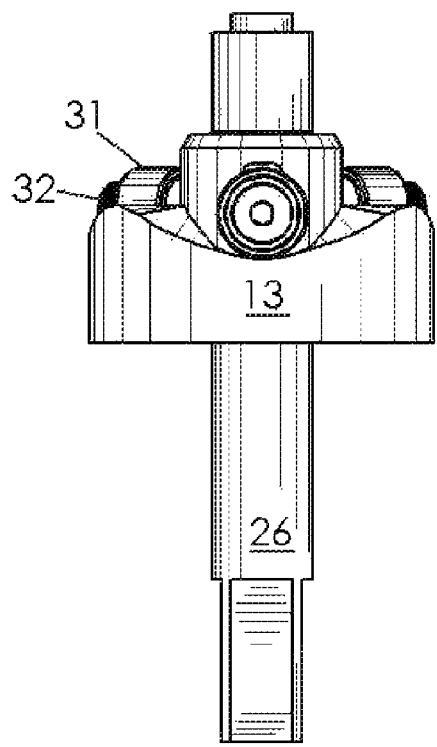
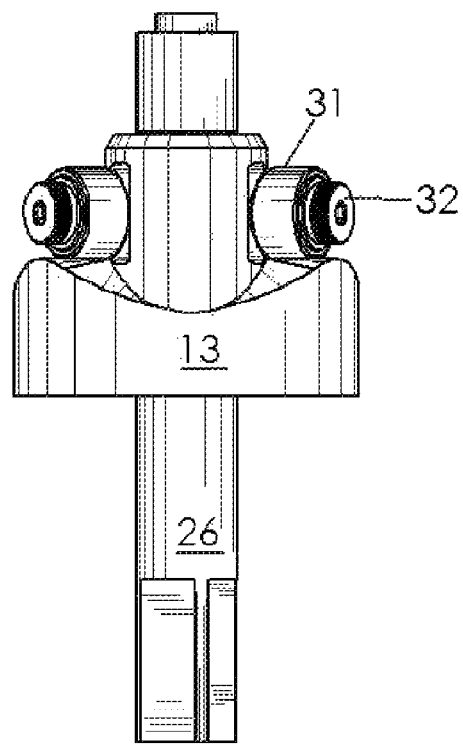
Figure 6  Figure 7

PIVOT CONTROL MECHANISM

FIELD OF THE INVENTION

This invention pertains to the pivot control mechanism used within a turnstile for the purpose or process of controlling passage between two separate areas.

BACKGROUND OF THE INVENTION

In recent years, turnstile pivot control mechanisms have become increasingly more sophisticated in facilitating the monitoring of personnel passage between two separate areas. Only recently, the pivot control mechanism has redeveloped from mechanical to electro-mechanical devices.

Typically, the pivot control mechanisms have been bulky and costly to construct. Such construction has suffered from a number of inherent problems. One problem would be the double ratchet operation, requiring multi-sets of hardware for each direction of motion, resulting in bulk and additional weight to the mechanism. A second problem would be if the operation were a clutched operated mechanism, requiring constant maintenance to keep the operation constant.

Additionally, a further problem has been the number of individual or separate components used in the manufacturing process of the pivot control mechanism owing to inventory, manufacturing and assembly difficulties. These problems all contribute to the mechanism being excessively heavy, awkward to handle, costly to manufacture, ship and install.

Still another problem encountered with the construction of the mechanism has centered on the rotor control mechanism. It is these mechanisms, which facilitate rotational control of the rotor, accommodating both directional operations. In the past, these have been a large component and take excessive space to accommodate.

BRIEF SUMMARY OF THE INVENTION

The present invention contemplates a new and improved mechanism that overcomes all of the above-identified problems and provides a new pivot control mechanism construction, that is simple in design and economical to manufacture.

In accordance with the new and improved pivot control mechanism construction, the pivot control mechanism facilitates selective rotational control of the pivot column through a plurality of operational modes. Traditionally it is contained in a "U" shaped channel, attached to a cage-like structure by way of bearing mounting holes that contain the main plate, mounted directly on the channel by means of using the bearing flange mounting holes or by welded blocks on the bottom of the channel for improved security.

There are four studs on the main plate supporting the top plate. In between the main plate and the top plate is located the pivot control mechanism. On the main plate are two flanges with a bearing, four plate studs to hold the top plate and four threaded rods connecting the middle plate. On the middle plate are three guided rods on which a lofted ratchet slides, and three compression springs. The top plate has two arm micro-switches with rollers, a bearing, and a shock absorber mounting bracket with a shock absorber, a shock rod, a shock block and a cam follower. Additionally, attached to the top plate is a solenoid bracket with solenoid. Also contained are two locking pawls with torsion springs pivoting on shoulder screws with a thrust washer. A shaft is captured in a top plate bearing and main plate bearing with three shoulder screws with cam followers attached.

BRIEF DESCRIPTION OF THE SEVERAL VIEWS OF THE DRAWINGS

FIG. 1 is a Diametric View of the pivot control mechanism formed in accordance with the present invention.

FIG. 3A is a detailed view of the pawl and ratchet.

FIG. 6 is a Home Position view of the simplified pivot control mechanism.

FIG. 7 is a Peak Position view of the simplified pivot control mechanism

DETAILED DESCRIPTION OF THE INVENTION

Figure 1:
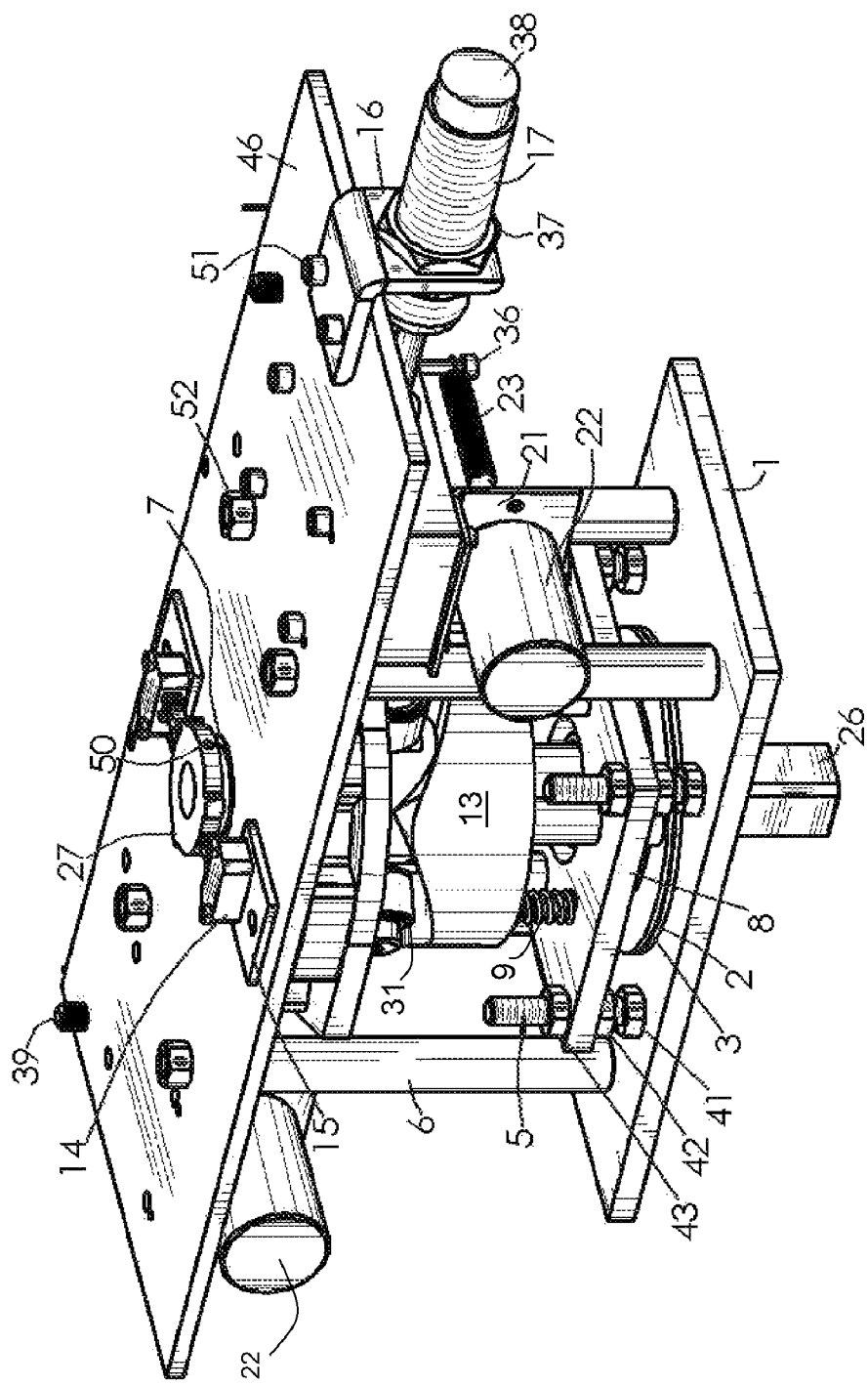
FIG. 1 is a block diagram of a first embodiment of the present invention.

Referring to the drawings, they only demonstrate the purpose of preferred embodiment of the invention and not for the purposes of limiting same. The figures illustrate a pivot control mechanism in seven detailed construction views.

More specifically, FIG. 1 conventionally demonstrates the pivot control mechanism according to the present invention that includes a top plate 46, with a switch adjustable plate 15 on which an arm micro-switch with roller 14 is attached to the switch activator 27 and is held on the pivot control shaft 26 by a set screw 50. Additionally connected to the top plate 46 is the shock absorber bracket 16, fastened with hex socket cap screws 51, and the adjustable shock absorber 17. Connected hereunder to the shaft 26 is a ratchet 29 and shock absorber cam 30 made from one piece of metal as demonstrated in FIG. 2.

Figure 4:
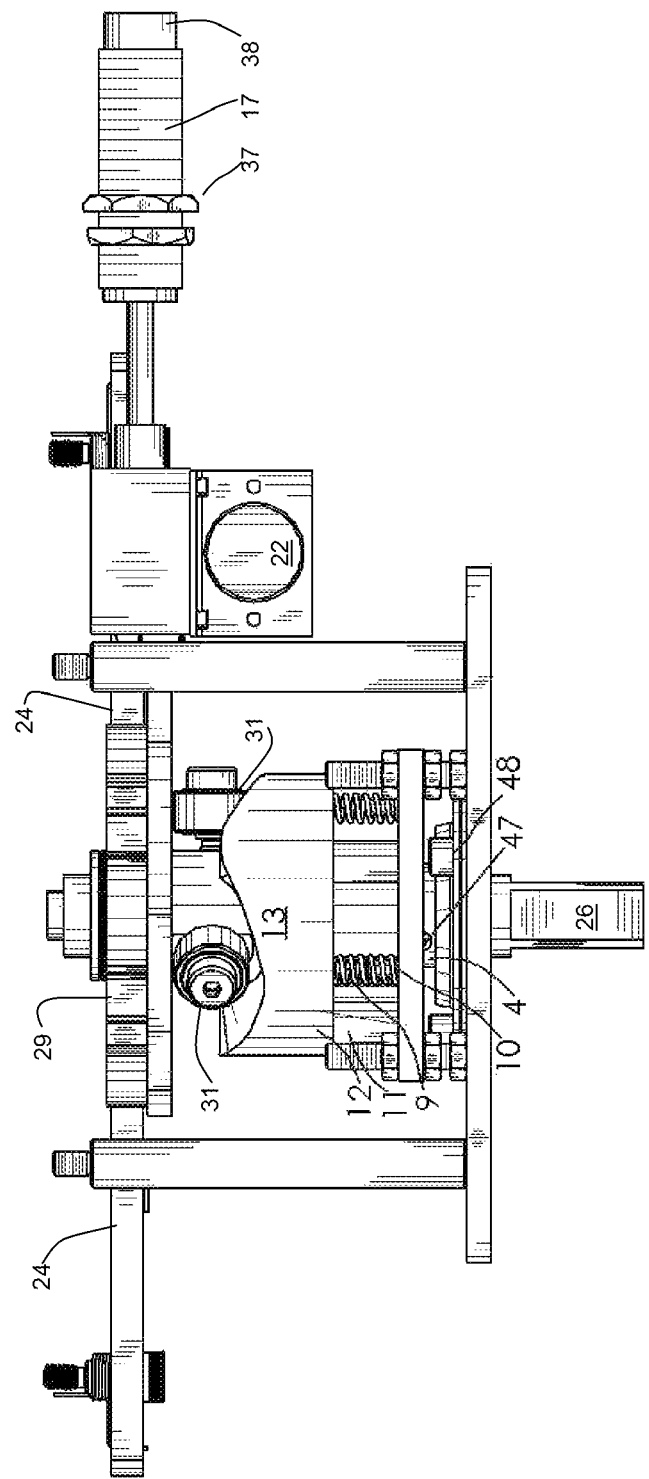
FIG. 4 is a Plan View of the pivot control mechanism with the top plate removed.
Figure 5:
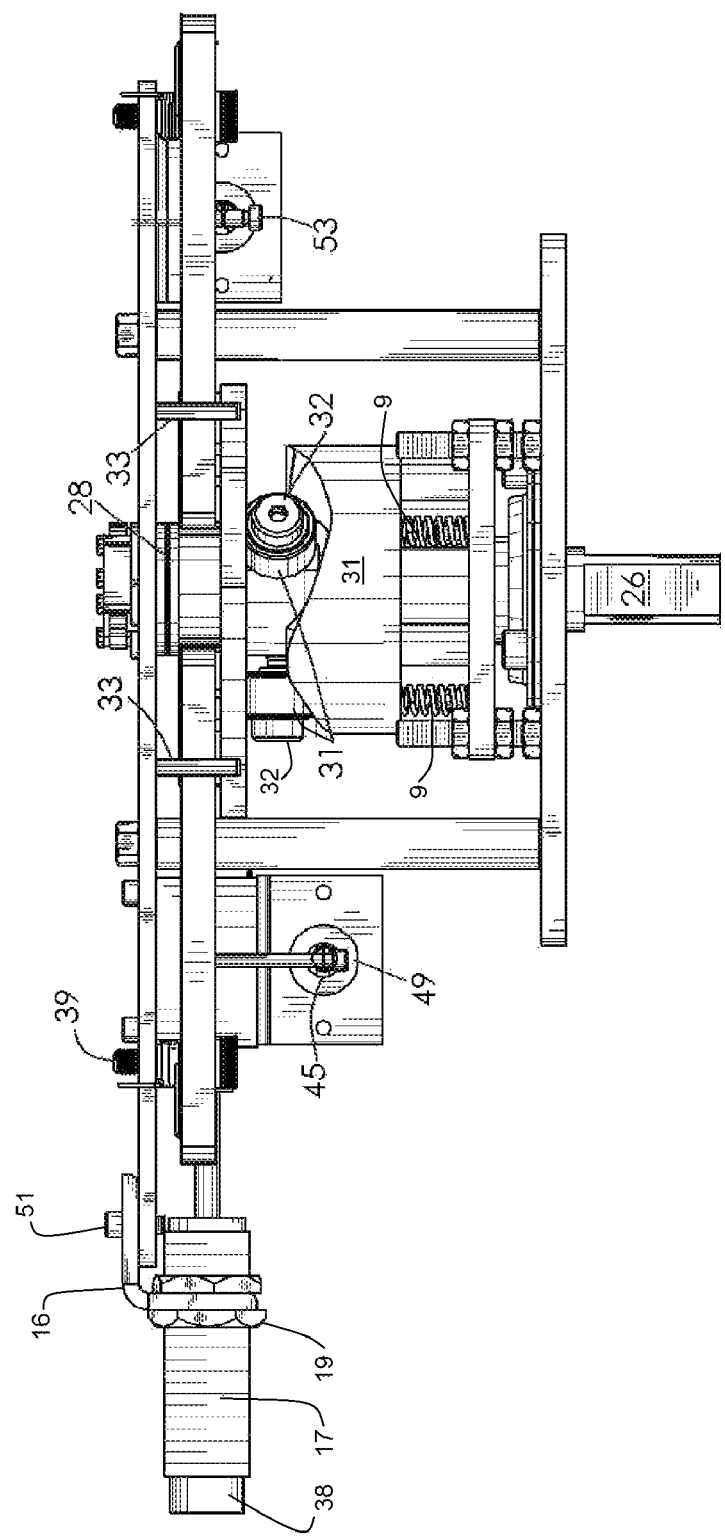
FIG. 5 is a Reverse Plan View of the pivot control mechanism.

With reference to FIG. 5, thrust-bearing 28 absorbs the axial load of the compression springs 9 and transmits the load to top plate 46. Shaft 26 rotates in the top plate bearing 7 and the shaft bearing 4. Shaft bearing 4 is captured in upper and lower flanges 2 and 3 and is fastened to the main plate 1 with hex socket cap screws 48. Shaft 26 is held in shaft bearing 4 with set of set-screws 47, as illustrated in FIG. 4. Four plate studs 6 are screwed into the main plate 1, and connect to top plate 46 with hex nuts 52. Ratchet 29 with six equidistantly spaced grooves on the circumference, controls the direction of the rotation of the mechanism in conjunction with pawls 24.

Figure 3:
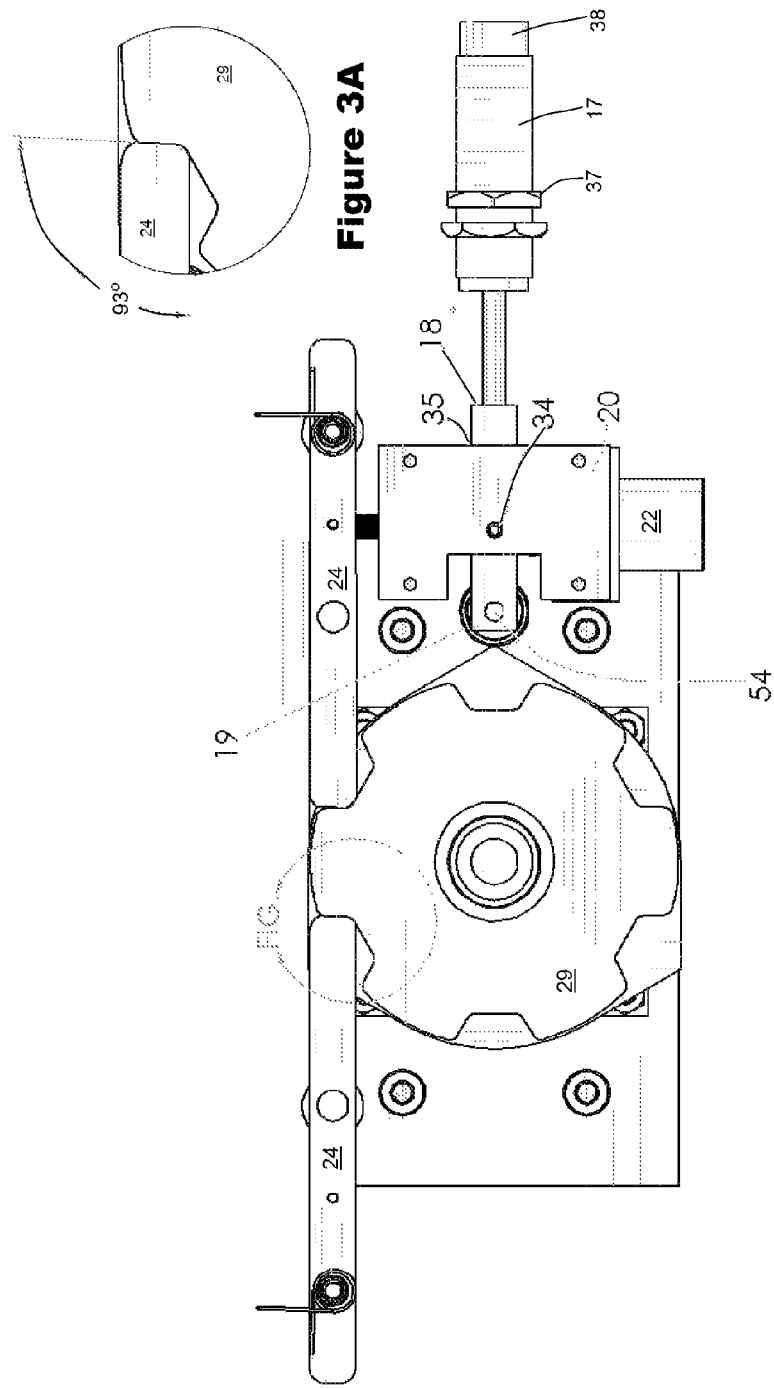
FIG. 3 is a Top View of the pivot control mechanism with the top plate removed.

Rotatably mounted shock absorber cam 30 has a continuous peripheral cam surface with a plurality of equidistantly spaced apexes attached to the pivot control mechanism shaft 26. Shock cam follower 19 rotates on shoulder screw 54 which is fastened to shock rod 18, that slides inside slider body 20 on bushing 35 (as illustrated in FIG. 3) and is aligned in position with pin 34. Shock cam follower 19 engages with the surface of shock absorber cam 30, providing general bias in association with the shaft 26. Lofted ratchet cam followers 31 run on the surface of lofted ratchet 13 to the home position.

As illustrated in FIG. 3, shock absorber 17 may be adjusted either by increasing or decreasing the force on the shock cam follower 19 which rotates on the shoulder screw 54. Adjustment of the shock absorber 17 is made by rotating shock absorber nut 37 on shock absorber bracket 16 or by shock absorber adjustable control 38, as illustrated in FIG. 1. As illustrated in FIG. 3, pawls 24 rotate on shoulder screws 39 opening and closing the pawl 24, allowing the ratchet 29 of the pivot control mechanism to rotate in either direction. The right hand 25 or left hand 44 torsion spring are always in tension forcing pawls 24 in an inward or outward direction from the ratchet, depending on the configuration of the mechanism. For strictly mechanical operation of the pivot control mechanism, the right hand torsion spring 25 controls the selective rotation only in one direction.

The left hand torsion spring 44 controls the selective rotation of the pivot control mechanism in the other direction. Pawls 24 as illustrated in FIG. 3 have a 93° (obtuse) corner. FIG. 3A illustrates said pawl 24 sliding into the groove of the ratchet 29. The 93° corner, as illustrated in FIG. 3A, allows an easy engagement and/or disengagement of pawl 24 with ratchet 29.

The chosen configuration of the turnstile determines the shape of the lofted ratchet 13, which as illustrated in FIGS. 1-2 and 5-7 comprises a cylindrical cam. If the chosen turnstile has three sets of arms, the hollow cylindrical shaped lofted ratchet 13 is divided equally into three home positions and three peak positions. If there is a requirement for four sets of arms, the hollow cylindrical lofted ratchet 13 is divided into four home and four peak positions. The above configuration will also determine the number of grooves on the ratchet 29. For example, for three sets of arms equals six grooves, for four sets of arms equals eight grooves. This also correlates to the shape change of the shock absorber cam 30.

Yet in another embodiment, a manual key lock feature (not illustrated) may be provided, which may allow for the selective disabling of one of the solenoids 22 resulting in a selective rotation of the mechanism.

In accordance with an aspect of the invention, "home" means the cam followers 31 are being interposed in the lowest position of the wave of the lofted ratchet 13, as illustrated in FIG. 6. In accordance with another aspect of the invention, "peak" means the cam followers 31 are positioned on the highest positions of the wave of the lofted ratchet 13 and is illustrated in FIG. 7.

The main objective of the invention is to present the new pivot control mechanism for selective control of the turnstile rotor. Other benefits and advantages of the new pivot control mechanism will become apparent to those skilled in the art, upon reading and understanding this specification.

Depending on the location of the card reading device, not illustrated, positioned either in an unsecured area or secured area, a signal is received from the reading device and is processed by the control board, not illustrated, allowing or disallowing passage to occur. The board energizes solenoid 22, held by solenoid bracket 21, pulling solenoid core 49 inward. Solenoid spring 23, held in solenoid core 49 with spring pin 45, pulling on pawl spring screw 36 or 53 overcomes the force created by the right or left torsion spring 25 or 44 pulling pawl 24 into the groove of ratchet 29.

Figure 2:
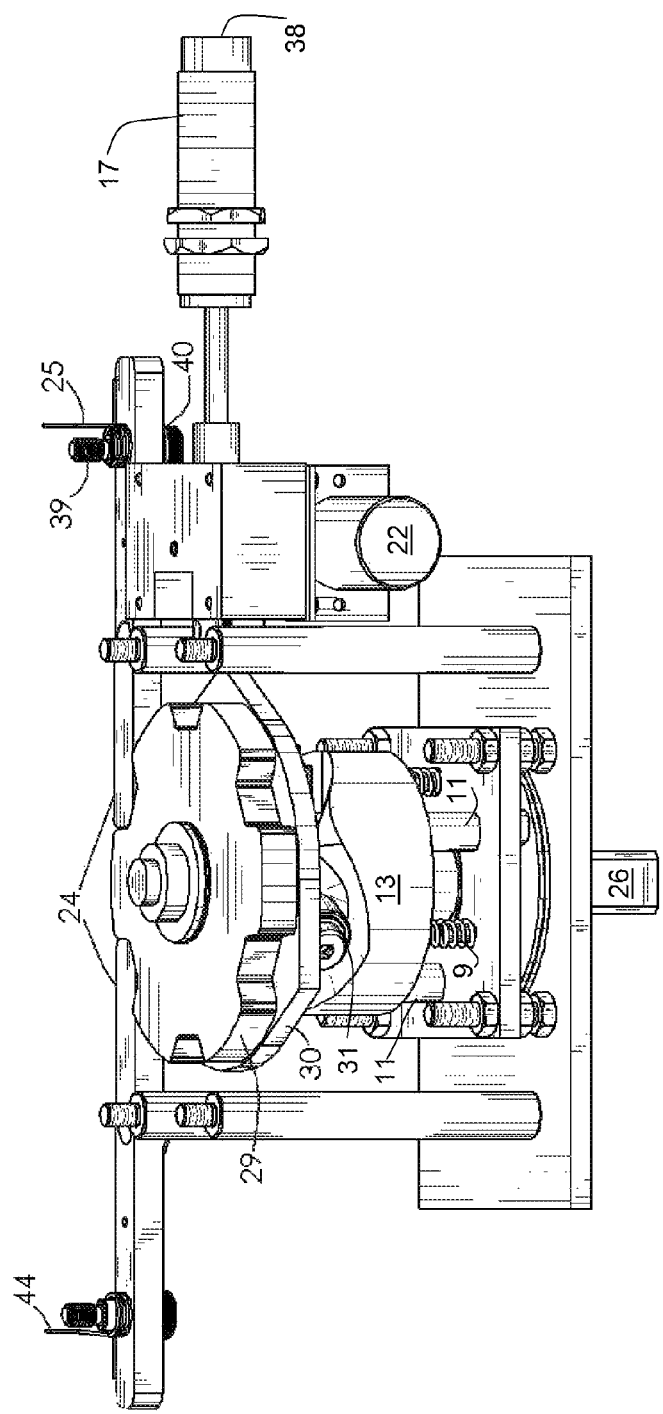
FIG. 2 is an Oblique Top View of the pivot control mechanism with the top plate and solenoid removed.

The pawl rotates around the shoulder screw 39 and the pawl shoulder screw thrust washer 40 as illustrated in FIG. 2. At that moment, the second solenoid is de-energized. The right or left hand torsion spring 25 or 44 extracts the solenoid core 49 from the solenoid 22 and disengages the pawl 24 from the ratchet groove 29. The spring pins 33 stops the pawl 24 from over-rotating as illustrated in FIG. 5. This permits rotation of the mechanism in one direction only.

Following the passage function, the arm micro-switch with roller 14 is activated by the switch activator 27, transferring the signal back to the control board, energizing the second solenoid 22, which locks the pawl 24 into the ratchet groove 29. When the shaft 26 rotates, the cam followers 31, which are secured to the shaft with shoulder screws 32, roll on the wave of the lofted ratchet 13 to the home position. For one passage the cam followers 31 travel over the peak FIG. 7, back into the home position FIG. 6. The free end of the shaft 26 can be modified to meet any existing turnstile system.

Lofted ratchet 29 has guide pin bushings (not illustrated), that are pressed into the holes of the lofted ratchet 29, in which guiding pins 11 slide. Compression springs 9, inserted over spring pin 10, secured in the middle plate 8, keep constant pressure on lofted ratchet 13, securing it in the home position.

To keep compression spring 9 constantly in contact with the lofted ratchet 13, the middle plate height 8 may be adjusted with nuts 42 on the threaded rod 5. When the desired pressure is set, the middle plate is secured with nuts 43. Threaded rods 5 are locked in position on the main plate 1 with hex nuts 41. The rotation of the shaft 26 also generates pressure on the shock absorber 17 through the shock absorber cam 30 attached to the shaft. This operation will smoothen the return of the cam follower 31 to the home position on the wave of the lofted ratchet 13.

While the preferred embodiment and various alternative embodiments of the invention have been disclosed and described in detail herein, it may be apparent to those skilled in the art that various changes in form and detail may be made therein without departing from the spirit and scope thereof.

The invention claimed is:

1. A turnstile pivot control mechanism adapted to electronically facilitate selective passage between two defined areas, said turnstile pivot control mechanism comprising:
   a shaft having a longitudinal axis, adapted to be coupled to a turnstile; and
   a ratchet mechanism for selectively locking the turnstile pivot control mechanism in place, the ratchet mechanism comprising:
      a ratchet having a continuous cam surface with a plurality of apexes disposed at spaced intervals therealong; and
      at least one rigid pawl, engaging the ratchet, so as to lock the shaft in place when engaged, so as to prevent rotation of a turnstile coupled to the shaft, wherein the at least one rigid pawl has an obtuse angle; and
      at least one actuator, coupled to a corresponding one of the at least one rigid pawl, to allow said at least one rigid pawl to be rotated to selectively engage and disengage with the ratchet to selectively lock and release the pivot control mechanism;
      wherein the ratchet further comprises grooves having an obtuse angle for easy engagement or disengagement of the at least one rigid pawl and for locking the pivot control mechanism in position;
   a cylindrical cam, spring-loaded and slideably mounted so as to slide coaxially with the longitudinal axis of the shaft, the cylindrical cam having a continuous waveform cam surface formed on one end of thereof, with a plurality of home positions and a plurality of peak positions therealong; and
   at least one cam follower, normally urged into engagement with said continuous waveform cam surface of the cylindrical cam, biasing said pivot control mechanism to one of said plurality of home positions such that when a user pushes on a turnstile coupled to the shaft and releases the turnstile coupled to the shaft, the turnstile coupled to the shaft returns to one of said plurality of home positions.

2. The turnstile pivot control mechanism of claim 1, further comprising:
   a plurality of guiding rods, parallel to the shaft and slidably mounted to the cylindrical cam to control axial motion of the cylindrical cam to slide in a coaxial manner with the longitudinal axis of the shaft.

3. The turnstile pivot control mechanism of claim 2, further comprising:
a plurality of compression springs coupled to and acting on the cylindrical cam to bias the cylindrical cam to slide longitudinally against the at least one cam follower, thereby securing the turnstile pivot control mechanism in one of the plurality of home positions.

4. The turnstile pivot control mechanism of claim claim 1, further comprising:
at least one spring-loaded cam follower coupled to a shock absorber; and
a shock absorber cam, coupled to the shaft and having a continuous cam surface engaging the at least one spring-loaded cam follower, with a plurality of apexes disposed at spaced intervals therealong such that as the shaft is rotated by a turnstile coupled to the shaft, the apexes of the shock absorber cam depress the at least one spring-loaded cam follower such that the shock absorber absorbs shock of a turnstile coupled to the shaft when turning.

5. A turnstile pivot control mechanism construction adapted to electronically facilitate the selective passage between two defined areas, said pivot control mechanism comprising:
a shaft having a longitudinal axis, adapted to be coupled to a turnstile;
a cylindrical cam, spring-loaded and slideably mounted so as to slide coaxially with the longitudinal axis of the shaft, the cylindrical cam having a continuous waveform cam surface formed on one end of thereof, with a plurality of home positions and a plurality of peak positions therealong; and
at least one cam follower, normally urged into engagement with said continuous waveform cam surface of the cylindrical cam, biasing said pivot control mechanism to one of said plurality of home positions such that when a user pushes on a turnstile coupled to the shaft and releases the turnstile coupled to the shaft, the turnstile coupled to the shaft returns to one of said plurality of home positions.

6. The turnstile pivot control mechanism of claim 5, further comprising:
a ratchet mechanism for selectively locking the turnstile pivot control mechanism in place, the ratchet mechanism comprising:
a ratchet having a continuous cam surface with a plurality of apexes disposed at spaced intervals therealong; and
at least one rigid pawl, engaging the ratchet, so as to lock the shaft in place when engaged, so as to prevent rotation of a turnstile coupled to the shaft.

7. The turnstile pivot control mechanism of claim 6, wherein the at least one rigid pawl has an obtuse angle; the ratchet mechanism further comprising:
at least one actuator, coupled to a corresponding one of the at least one rigid pawl, to allow said at least one rigid pawl to be rotated to selectively engage and disengage with the ratchet to selectively lock and release the pivot control mechanism.

8. The turnstile pivot control mechanism of claim 7, wherein the ratchet further comprises grooves having an obtuse angle for easy engagement or disengagement of the at least one rigid pawl and for locking the pivot control mechanism in position.

9. The turnstile pivot control mechanism of claim 5, further comprising:

a plurality of guiding rods, slidably mounted to the cylindrical cam to control axial motion of the cylindrical cam to slide in a coaxial manner with the longitudinal axis of the shaft.

10. The turnstile pivot control mechanism of claim 9, further comprising:
a plurality of compression springs coupled to and acting on the cylindrical cam to bias the cylindrical cam to slide longitudinally against the at least one cam follower, thereby securing said mechanism in position.

11. The turnstile pivot control mechanism of claim 5, further comprising:
at least one spring-loaded cam follower coupled to a shock absorber; and
a shock absorber cam, coupled to the shaft and having a continuous cam surface engaging the at least one spring-loaded cam follower, with a plurality of apexes disposed at spaced intervals therealong such that as the shaft is rotated by a turnstile, the apexes of the shock absorber cam depress the at least one spring-loaded cam follower such that the shock absorber absorbs shock of the turnstile when turning.

12. A turnstile pivot control mechanism adapted to electronically facilitate the selective passage between two defined areas, said pivot control mechanism comprising:
a shaft having a longitudinal axis, adapted to be coupled to a turnstile;
at least one spring-loaded cam follower coupled to a shock absorber; and
a shock absorber cam, coupled to the shaft and having a continuous cam surface engaging the at least one spring-loaded cam follower, with a plurality of apexes disposed at spaced intervals therealong such that as the shaft is rotated by a turnstile, the apexes of the shock absorber cam depress the at least one spring-loaded cam follower such that the shock absorber absorbs shock of the turnstile when turning;
a ratchet mechanism for selectively locking the turnstile pivot control mechanism in place, the ratchet mechanism comprising:
a ratchet having a continuous cam surface with a plurality of apexes disposed at spaced intervals therealong;
at least one rigid pawl, engaging the ratchet, so as to lock the shaft in place when engaged, so as to prevent rotation of a turnstile coupled to the shaft, wherein the at least one rigid pawl has an obtuse angle; and
at least one actuator, coupled to a corresponding one of the at least one rigid pawl, to allow said at least one rigid pawl to be rotated to selectively engage and disengage with the ratchet to selectively lock and release the pivot control mechanism;
wherein the ratchet further comprises grooves having an obtuse angle for easy engagement or disengagement of the at least one rigid pawl and for locking the pivot control mechanism in position;
a cylindrical cam, spring-loaded and slideably mounted so as to slide coaxially with the longitudinal axis of the shaft, the cylindrical cam having a continuous waveform cam surface formed on one end of thereof, with a plurality of home positions and a plurality of peak positions therealong; and
at least one cam follower, normally urged into engagement with said continuous waveform cam surface of the cylindrical cam, biasing said pivot control mechanism to one of said plurality of home positions such that when a user pushes on a turnstile coupled to the shaft and releases the turnstile coupled to the shaft, the turnstile coupled to the shaft returns to one of said plurality of home positions.

13. The turnstile pivot control mechanism of claim 12, further comprising:
a plurality of guiding rods, slidably mounted to the cylindrical cam to control axial motion of the cylindrical cam to slide in a coaxial manner with the longitudinal axis of the shaft.

14. The turnstile pivot control mechanism of claim 13 further comprising:
a plurality of compression springs coupled to and acting on the cylindrical cam to bias the cylindrical cam to slide longitudinally against the at least one cam follower, thereby securing said mechanism in position.

* * * * *